R. M. DIXON.
HOSE APPLIANCE.
APPLICATION FILED OCT. 6, 1909.
1,004,634.
Patented Oct. 3, 1911.
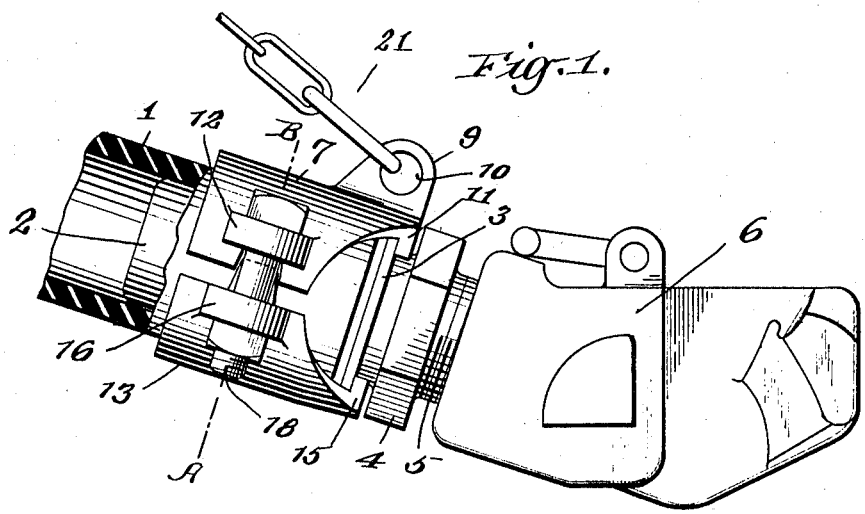
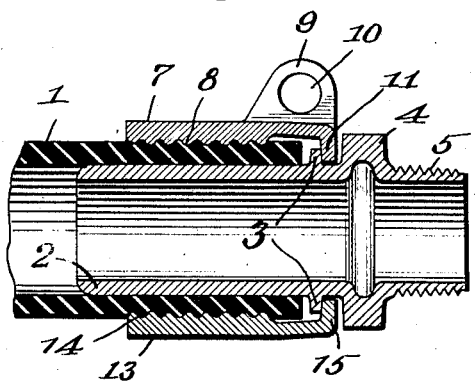
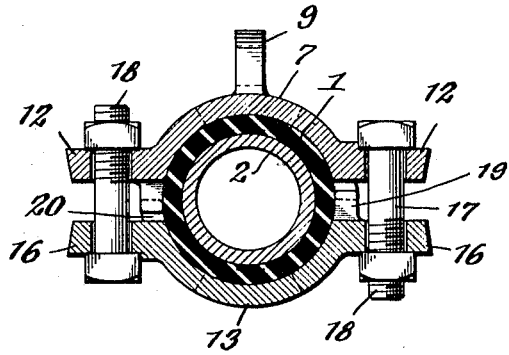
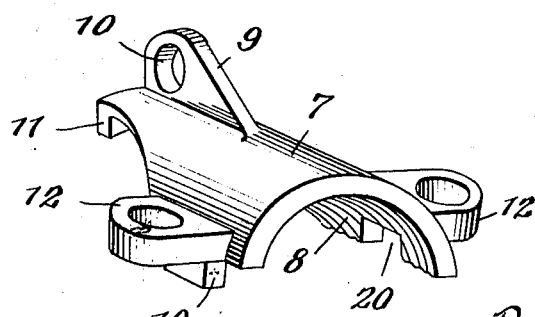
WITNESSES:
H. Cerocheron
E. Hall
INVENTOR
Robert M. Dixon
BY
John L. Creveling
ATTORNEY

UNITED STATES PATENT OFFICE.

ROBERT M. DIXON, OF EAST ORANGE, NEW JERSEY, ASSIGNOR TO SAFETY CAR HEATING & LIGHTING COMPANY, A CORPORATION OF NEW JERSEY.

HOSE APPLIANCE.

1,004,634.     Specification of Letters Patent.     Patented Oct. 3, 1911.

Application filed October 6, 1909. Serial No. 521,317.

*To all whom it may concern:*

Be it known that I, ROBERT M. DIXON, a citizen of the United States, residing in East Orange, county of Essex, and State of New Jersey, have invented new and useful Improvements in Hose Appliances, of which the following is a description.

My invention pertains to that class of hose appliances used for the purpose of holding a flexible hose in a fixed relation to some member in which relation it is desired it shall be held.

My invention comprehends means whereby a flexible hose may be attached to a hose nipple so as to be retained in a desired position thereon without injury to the hose when subjected to high pressure or to strain tending to part the same from said nipple.

A further object of my invention is to insure a steam or gas tight joint between the hose and the nipple and provide means whereby strain tending to withdraw the nipple from the hose will be borne largely by the outer portion of the hose, commonly known as "the friction coating" and not by the inner portion which is usually of a softer and more flexible material and not intended to withstand much strain.

In the drawing Figure 1 is a side elevation of one type of my improved hose appliance shown with a section of steam hose upon the nipple which is shown connected with a typical steam coupler such as used in connecting steam heating lines on railroad cars, the said coupler being shown in elevation and the hose partly in elevation and partly in section. Fig. 2 is a longitudinal section of my improved hose appliance, the nipple of which is shown with a threaded extension which may be used for connection with a steam coupler as shown in Fig. 1 or may be used for operatively connecting the hose with any desired apparatus. Fig. 3 is a transverse section of my improved hose appliance through the line A—B of Fig. 1 as viewed from the left-hand side. Fig. 4 is a perspective view of one of the members forming my improved hose appliance.

In the drawing, 1 represents a portion of a hose or flexible tubing which it is desired to hold in a given operative position as by my improved appliance.

2 represents the nipple portion of my appliance which is provided with a circular flange or collar 3 and a hexagonal portion 4 and screw portion 5, the hexagonal portion 4 serving to provide a member easily engaged by a wrench or other suitable means for making up the screw portion 5 into any type of apparatus to which it is desired to attach the hose as, for example, into the coupler 6 as shown in Fig. 1.

7 represents one of the members of my appliance provided with internal corrugations 8 adapted to engage the hose as shown in Fig. 2 and provided with a boss 9 having therein the opening 10 adapted to engage a chain 21 which may be fastened to some fixed object for a purpose which will hereinafter appear. The member 7 is also provided with the flange 11 adapted to engage the flange 3 of the nipple 2 in such manner that the nipple 2 cannot be extracted from the hose 1 without moving the member 7. The member 7 is also provided with laterally extending bosses 12 for the purpose of engaging bolts 18. One side of the member 7 is provided with a lug 19 (see particularly Fig. 4) while the other side is provided with a recess 20, the functions of which will hereinafter more plainly appear.

13 represents a member similar to the member 7 provided with the internal corrugations 14 and lip or flange 15 adapted to engage the flange 3 upon the nipple 2. The member 13 is provided with the bosses 16 adapted to be engaged by the bolts 18 and also on one side with a projection 19 and a recess 20 (see Fig. 3) in such manner that when the member 7 and the member 13 are brought face to face with each other the boss 19 of each member will register with the recess 20 of the other member and therefore hold the two members in a given longitudinal position.

In attaching my appliance to a length of hose I proceed as follows: The hose nipple 2 is coated with shellac or some other suitable cement and then forced into the opening of the hose 1 which, if the nipple and bore of the hose be of proper dimensions, may be done without injury or submitting the hose to any excessive strain. I then place the member 7 upon one side of the hose in such manner that the projection 11 will engage the flange 3 as shown in Figs. 1 and 2. I then place the member 13 on the opposite side of the hose in such manner that its flange 15 will engage the flange 3.

The boss 19 of each of the said members will then register with the recess 20 of the opposite member and the holes in the bosses 12 and 16 will be in line. I then insert the bolts 18 and make up the nuts upon the same in such manner as to force the members 7 and 13 against the hose 1 until the hose tightly fills the corrugations of the members 7 and 13. Then the nipple 2 may be made up into the apparatus to which it is desired to attach the hose as, for example, the coupler 6 as shown in Fig. 1 and the safety chain 21 may then be fastened to the boss 9 and if it have its other end attached to a fixed object will then relieve the hose of strain in certain directions as, for instance, when the coupler 6 is drawn in a direction substantially in line with the chain, owing to the engagement of the members 11 and 15 with the flange 3. However, any strain tending to pull out the nipple 2 as, for instance, in a direction in which it is not taken up by the chain as, for example, the action of internal pressure, the hose will be held tightly upon the nipple owing to the grip on the outerside thereof by the corrugated portions 8 and 14 of the members 7 and 13 respectively which in turn hold the nipple firmly by the engagement of the members 11 and 15 with the flange 3. It will thus be obvious that any strain tending to withdraw the nipple from the hose will tend to move the members 7 and 13 which grip the outer portion of the hose which is usually made of a strong material and not strain the inner portion thereof which is usually of a softer stock.

I do not wish in any way to limit myself to the exact construction shown in the attached drawing which it is understood merely shows one type of apparatus embodying my invention and in which considerable alteration in design may be made without departing from the spirit thereof.

Having thus described my invention what I consider as novel and desire to cover by Letters Patent is as set forth in the following claims to wit:

1. A hose appliance comprehending a smooth nipple portion adapted to be inserted within the bore of a hose and provided with a flange, a plurality of members provided with corrugations adapted to be drawn together to operatively engage the exterior of a hose without tending to cut the same and means whereby the said last named members engage the flange upon said nipple.

2. A hose appliance comprehending a smooth nipple portion adapted to be inserted within the bore of a hose and provided with a flange, a plurality of members provided on their inner surfaces with a plurality of rolling corrugations adapted to be drawn together to be pressed into and engage the exterior of a hose and means whereby the said last named members engage the flange upon said nipple.

3. The combination with a hose, of a smooth nipple inserted in the bore thereof and provided with a flange, a plurality of rolling internally corrugated members operatively engaging the exterior portion of said hose and the said flange to hold the hose in place with respect to said flange.

4. The combination with a hose, of a smooth nipple inserted therein and provided with a flange, a member provided with a non-shearing corrugated portion and means for engaging said flange and means whereby the corrugated portion of said member is caused to operatively engage the outer portion of said hose in such manner that strain tending to extract the nipple is carried by the outer portion of said hose.

5. The combination with an elastic tube, of a smooth nipple inserted therein and provided with a flange, a plurality of members surrounding the outer portion of said tube and provided with smoothly corrugated inward surfaces, means whereby said members engage the flange on said nipple and means whereby said members have their corrugated surfaces pressed into the outer portion of said tube in such manner that strain tending to extract said nipple is borne by the outer portion of said tube.

6. The combination with an elastic tube, of a smooth nipple inserted therein and provided with a flanged portion, a member having corrugated inner surfaces adapted to engage the exterior of said tube and the flanged portion of said nipple provided with means for engaging a tension member to relieve the hose of strain caused by pull upon the nipple.

7. The combination with an elastic tube, of a smooth nipple inserted therein and provided with a shoulder, a clamp having rolling corrugations adapted to engage the outer portion of said tube and compress the same upon said nipple and means whereby said clamp engages the said shoulder of said nipple in such manner that strain tending to extract the nipple is carried by the outer portion of said tube.

8. The combination with an elastic tube, of a smooth nipple inserted therein and provided with means capable of longitudinal engagement and means operatively pressing into and engaging without tending to shear the exterior portion of said tube and the said engaging means of said nipple whereby strain tending to withdraw the nipple is substantially all borne by the exterior portion of said tube.

9. The combination with an elastic tube, of a smooth nipple inserted therein and provided with means capable of longitudinal engagement, a plurality of members surrounding said tube and presenting thereto a rolling surface, means for firmly clamping said surfaces against said tube and means whereby said members engage the engagement member of said nipple in such manner that strain tending to extract said nipple is substantially all carried by the outer portion of said tube.

10. The combination with an elastic tube, of a smooth nipple therein and a plurality of members having rolling inner surfaces of considerable length compared with said nipple surrounding said tube and compressed thereinto, means whereby strain tending to withdraw the nipple is transmitted to said members and means for connecting the members with a tension member.

11. The combination with an elastic tube, of a smooth nipple inserted therein, members provided with rolling inner surfaces tightly pressed against the exterior of said tube so as to engage without tendency to shear the same and means whereby strain tending to extract said nipple is substantially all transmitted to said members engaging the exterior portion of the tube.

12. The combination with an elastic tube having an outer portion capable of standing greater longitudinal strain than the inner portion, of a smooth nipple inserted into the said tube and provided with a longitudinal engaging member, of a clamp provided with gripping members having rolling internal engaging surfaces, means for engaging the longitudinal engaging member of said nipple and means for clamping the said gripping members into the outer portion of said tube.

13. The combination with an elastic tube having an outer portion adapted to withstand longitudinal strain, of a smooth nipple inserted in the bore of said tube and means engaging said nipple and rolling internal surfaces pressed into said outer portion of the tube in such manner that strain exerted upon said nipple tending to extract the same is substantially all transmitted to the said outer portion.

ROBERT M. DIXON.

Witnesses:
ELMER E. ALLBEE,
JOHN T. CLARK.